Reissued Nov. 25, 1930 Re. 17,878

UNITED STATES PATENT OFFICE

ANDRÉ HENRI VICTOR DURR, OF PARIS, FRANCE, ASSIGNOR TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE

RESINOUS CONDENSATION PRODUCT

No Drawing. Original No. 1,739,447, dated December 10, 1929, Serial No. 329,940, filed January 2, 1929, and in France December 31, 1927. Application for reissue filed August 19, 1930. Serial No. 476,446.

In the specification of my United States Patent No. 1,739,446, I have described the preparation of new esters and derivatives and their resinous condensation products by esterifying the alcohol radicals of a polyhydric alcohol, glycerine for example, by means of a mixture of an aromatic polybasic acid, phthalic anhydride for example, and one or more natural resins, such as colophony, manila gum, etc., in such a manner that only a part of the hydroxyl content of the alcohol is replaced by the acid, another part is replaced by the natural resin (through its resinic acid), and some free hydroxyl groups remain, the number of hydroxyl groups replaced by the acid and natural resin and those remaining free being varied at will according to the ester required.

It will be understood that for the purpose of the present invention, the terms "polybasic acids" and "natural resins" are of a general character, and include polybasic anhydrides in the one case, and natural gums in the other.

Glyceryl phthalate resins can be considered as polymers of glyceryl phthalate, all the free hydroxyl groups of the glycerine being replaced by the phthalic anhydride usually used in excess, so that these resins may be represented by the general formula—

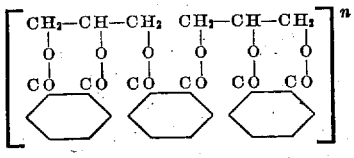

where $n$ indicates the degree of polymerization. The products obtained by heating with resin are derivatives of this fundamental base.

The above is a general description of the theory in regard to the resinous products as originated in the laboratories of the General Electric Co.

In the present invention, the construction of the resin base is of a somewhat different nature. If the resinic acid of a natural resin be represented by R—COOH, then the general form of the new resinous products may be represented somewhat as follows, $n$ having the same meaning as before:

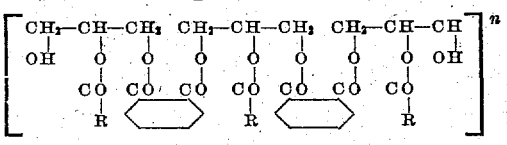

From this, it will be seen that the base is of a form which is distinctly novel, no reference to any such base being made in the prior art.

The object of the present invention is to produce condensation products of these new resinous products with linseed oil or other siccative oil with a view to obtaining compounds possessing properties similar to those of the oil varnishes.

New industrial products have been obtained by heating these new resins with a siccative oil, linseed oil for example, in an autoclave, without the agency of a solvent.

A homogeneous mass in the form of a more or less viscous liquid mass is obtained under these conditions. By dissolving the mass in different solvents singly or mixed together, arising from the distillation of coals, tars and petroleums (such as benzol, toluol, xylol, petroleum, naphtha, coal-tar oil, etc.) varnishes are obtained, drying above 110–120° and used in the electric industries and in oven or furnace varnishing.

The films obtained with these varnishes have remarkable qualities of adherence and flexibility as well as a high dielectric strength. For example, a varnish baking at 300° and giving a film having a dielectric value of 1520 volts to one hundredth of a millimetre (average of 8 tests) has been obtained with the varnish described in Example No. II.

The varnishes prepared from these new compounds are sensitive to the action of drying agents or siccatives, which shows that the hardening of the film is accomplished principally by way of oxidation.

The following are a few examples of the manner in which these new compounds and varnishes therefrom may be prepared:—

*Example I*

450 parts of linseed oil are placed in a well stirred autoclave together with 450 parts of resin prepared as described in Example I of my said Patent No. 1,739,446, to wit, by adding a mixture of phthalic anhydride and colophony (acid value=162.5) to glycerine, the proportions being 285, 200 and 240 parts respectively, at 110°, raising the temperature to 260° in 15–20 hours, and after maintaining the reaction mixture at this temperature for 2 hours, running the product off. The mass of oil and resin is heated for 16 hours at 210°. The pressure rises to 5 or 6 kilos.

The mass is then left to cool at 50°–60° and tests made to ascertain if it be completely homogeneous. If it does not happen to be so, it is heated again for 8 hours at 250° and longer if necessary.

The mass is in a viscous form at the ordinary temperature, of a greenish yellow colour, slightly fluorescent.

This example is not restrictive with regard to the proportions of siccative oil and resins, the nature of the resin and of the siccative oil, the duration and temperature of the heating which are naturally variable with the resin or mixture of resin used and the product desired.

*Example II*

100 parts of the condensation mass prepared under the conditions of Example I are diluted at 50° with 200 parts of naphtha which is poured in slowly.

Under these conditions a varnish is obtained which, after filtration, dries in a few seconds at 450°, in 3 minutes at 300°, 30–45 minutes at 200°, 15–20 hours at 110°.

The films obtained with this varnish, dried at 300°, have a dielectric strength of 1520 volts to the one hundredth of a millimetre.

*Example III*

100 parts of the mass obtained under the conditions of Example No. I are diluted at 60° by pouring on 200 parts of a mixture of benzene (63) toluene (63) xylene (63) coal tar oil (10). A varnish is obtained which dries under conditions similar to those of the previous varnishes.

Industrial benzols may of course be used instead of the above mentioned mixture.

*Example IV*

100 parts of the mass obtained under the conditions of Example No. I are diluted at 60°–70° with 200 grammes of slowly added white petroleum. The varnish is filtered before use. Under these conditions varnishes drying under conditions similar to those mentioned for the varnishes of Examples II and III are obtained.

Examples II, III and IV are not restricted with regard to the nature and proportions of solvent, and the nature of the resinous compound used.

All temperatures occurring in the specification are to be read as degrees centigrade.

I claim:

1. The method of preparing a resinous condensation product which consists in heating in an enclosed space under pressure a siccative oil and a synthetic resin having unesterified hydroxyl groups and formed by heating a polyhydric alcohol with a mixture of a polybasic acidic compound and at least one natural resin, the heating of said oil and resin being carried out at a temperature sufficiently high to produce a soluble reaction product in which the oil is chemically combined with said resin.

2. As a new product, a resinous condensation product obtained by acting on glycerine with a mixture of phthalic anhydride and a natural resin in quantity sufficient to replace only a part of the free hydroxyl groups in the glycerine by the phthalic anhydride and a part by the resinic acid of the resin and leave some free hydroxyl groups remaining until a resinous mass is formed and heating this resinous mass under superatmospheric pressure with a siccative oil until a homogeneous mass is obtained in which the oil is chemically combined and which is soluble in benzene and petrol derivatives.

3. Method of producing a resinous condensation product which method consists in heating an aliphatic polyhydric alcohol with a mixture of a polybasic acidic compound and at least one natural resin to obtain a resinous mass and heating the same with a siccative oil at about 210° C. for 16 hours under superatmospheric pressure and cooling at 50°–60° C. until a homogeneous mass is obtained, and having the oil so combined that it cannot be separated, as in the case of a simple solution.

4. Method as defined in claim 3, wherein the aliphatic polyhydric alcohol employed is glycerine.

5. Method as defined in claim 3, wherein the polybasic acidic compound employed is phthalic anhydride.

6. A new resinous condensation product obtained by heating in an enclosed space under pressure a siccative oil and a synthetic resin having unesterified hydroxyl groups and containing a polyhydric alcohol radicle, a polybasic acid radicle, and a natural resin radicle, the heating to be carried out at a temperature sufficiently high to produce a soluble reaction product in which the oil is chemically combined with said reagent.

In testimony whereof I have hereunto affixed my signature.

ANDRÉ HENRI VICTOR DURR.